(12) United States Patent
Krueger et al.

(10) Patent No.: US 8,190,344 B2
(45) Date of Patent: May 29, 2012

(54) OPTIMIZATION OF VEHICLE STABILITY AND STEERING DURING A REGENERATIVE BRAKING EVENT

(75) Inventors: Eric E. Krueger, Chelsea, MI (US);
Matthew M. Karaba, Oxford, MI (US);
Kevin S. Kidston, New Hudson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 870 days.

(21) Appl. No.: 12/248,083

(22) Filed: Oct. 9, 2008

(65) Prior Publication Data

US 2010/0094511 A1    Apr. 15, 2010

(51) Int. Cl.
*G05B 13/02* (2006.01)
(52) U.S. Cl. ......... 701/70; 701/22; 701/48; 903/947; 180/65.27; 180/65.275; 180/65.285
(58) Field of Classification Search ........... 701/41, 701/48, 70, 71, 22; 180/65.1, 65.22, 65.27, 180/65.275, 65.285, 65.31; 903/906, 947
See application file for complete search history.

(56) References Cited

U.S. PATENT DOCUMENTS

| | | | | |
|---|---|---|---|---|
| 5,576,959 | A * | 11/1996 | Hrovat et al. | 701/70 |
| 5,696,681 | A * | 12/1997 | Hrovat et al. | 701/70 |
| 5,973,463 | A * | 10/1999 | Okuda et al. | 318/430 |
| 6,398,252 | B1 * | 6/2002 | Ishikawa et al. | 280/727 |
| 6,454,364 | B1 * | 9/2002 | Niwa et al. | 303/152 |
| 6,735,510 | B2 * | 5/2004 | Hac | 701/70 |
| 7,104,617 | B2 * | 9/2006 | Brown | 303/152 |
| 7,136,737 | B2 * | 11/2006 | Ashizawa et al. | 701/70 |
| 7,181,326 | B2 * | 2/2007 | Lin et al. | 701/41 |
| 7,878,605 | B2 * | 2/2011 | Kokubo et al. | 303/151 |
| 7,957,881 | B2 * | 6/2011 | Itoh | 701/90 |
| 2002/0180266 | A1 * | 12/2002 | Hara et al. | 303/152 |
| 2004/0262994 | A1 * | 12/2004 | Baumann et al. | 303/155 |
| 2006/0190158 | A1 * | 8/2006 | Shiiba et al. | 701/70 |
| 2007/0244606 | A1 * | 10/2007 | Zhang et al. | 701/1 |
| 2010/0138117 | A1 | 6/2010 | White | |

FOREIGN PATENT DOCUMENTS

DE    102006046093 A1    4/2008
WO    WO 2008037347 A1 *    4/2008

\* cited by examiner

*Primary Examiner* — Paul N Dickson
*Assistant Examiner* — James English
(74) *Attorney, Agent, or Firm* — Quinn Law Group, PLLC

(57) ABSTRACT

A method of optimizing steering and stability performance of a vehicle includes measuring a set of inertial data during a regenerative braking event (RBE), calculating a set of vehicle performance data using the inertial data, and comparing the performance data to calibrated threshold data to determine a maximum regenerative braking torque (RBT). The maximum RBT is automatically applied during the active RBE. The vehicle includes a chassis, an electric motor/generator for applying an RBT, a frictional braking system, chassis inertial sensors for measuring a set of chassis inertial data, and a controller having an algorithm for calculating a set of vehicle performance data using the chassis inertial data. The controller determines the maximum RBT by comparing the vehicle performance data to corresponding threshold data. The chassis inertial sensors can include accelerometers, a yaw rate sensor, a steering rate sensor, speed sensors, and/or a braking input sensor.

16 Claims, 3 Drawing Sheets

| SENSOR | SIGNAL | [32] CALCULATION |
|---|---|---|
| 30A | $N_F, N_R$ | V; SLIP; $R_{DES}$ |
| 30B | OBT | $RBT_{MAX}$; FBT |
| 30C | $\theta_S$ | $R_{DES}$ |
| 30D | $a_x, a_y$ | VAV |
| 30E | R Actual | $R_{DES}$ |

Fig-3

OPTIMIZATION OF VEHICLE STABILITY AND STEERING DURING A REGENERATIVE BRAKING EVENT

TECHNICAL FIELD

The present invention relates generally to a method and an apparatus for optimizing vehicle stability and steering performance during an active regenerative braking event.

BACKGROUND OF THE INVENTION

Certain vehicle designs selectively utilize multiple energy sources in order to improve overall fuel economy, as well as to reduce levels of certain vehicle emissions. For example, a hybrid electric vehicle or HEV includes a rechargeable energy storage system (ESS) which is usually configured as a rechargeable battery or battery pack having a relatively high energy density. The HEV can also include a gasoline, diesel, or alternative fuel internal combustion engine. Other vehicle designs may alternately employ a fuel cell and/or another power source in place of or in conjunction with an internal combustion engine in order to further reduce vehicle emissions and improve the operating range of the vehicle.

In certain HEV designs, the drive wheels of the vehicle remain continuously connected to the driveline to enable regenerative braking capability, thus providing a relatively efficient means of capturing useful and otherwise wasted braking energy. As is known in the art, an electric motor/generator can be selectively operated in such a manner as to allow the device to act as a generator during an active regenerative braking event. When acting as a generator, the electric motor/generator recharges the ESS while applying a negative torque to the drive wheels and/or the drive shaft, thus electronically slowing the HEV. The electric motor/generator likewise can be selectively operated as an electric motor, thus drawing stored electrical energy from the ESS as needed to propel the HEV.

In an HEV equipped with antilock braking system (ABS), a traction control system (TCS), and/or electronic stability control (ESC), vehicle stability and steering performance can be improved using any or all of these devices. During an active regenerative braking event in an HEV, however, regenerative braking torque is ordinarily applied only to the wheels rotating on a common axle, which can potentially slip on a low coefficient of friction surface. Depending on which of the front or rear sets of wheels are slipping, the overall stability and/or steering control of the HEV can be affected. While ABS, TCS, and ESC each can help the HEV to quickly recover from such slip, it may be more desirable to prevent or preempt slip from occurring in the first place.

SUMMARY OF THE INVENTION

Accordingly, a method and apparatus are provided for use in a vehicle having regenerative braking capability as described above. The method is automatically executed via the apparatus during an active regenerative braking event or RBE. Signals transmitted or relayed from various inertial sensors are used as input signals to an electronic control unit or controller, which in turn calculates, selects, or otherwise determines a maximum regenerative braking torque or RBT that can be applied during the active RBE without causing the vehicle to under-steer or over-steer. A driver-commanded overall braking torque or OBT that is commanded by a driver or operator of the vehicle during the active RBE is provided by allocating the driver-commanded OBT between the calculated maximum RBT and a conventional frictional braking torque or FBT, with the calculated maximum RBT ranging from a theoretical maximum value or unrestricted value down to a zero value depending on the values of the various input signals.

Within the scope of the invention, the inertial sensors can include a steering angle sensor, accelerometers adapted to measure the lateral and longitudinal linear accelerations of the vehicle, wheel speed sensors connected to each of the road wheels of the vehicle, and/or a braking input sensor for detecting the driver-commanded OBT. Measurements from the inertial sensors are compared to a corresponding set of calibrated thresholds to determine a corresponding multiplier and/or a resultant error value for each of the measurements, with the multiplier and/or resultant error values used to set the magnitude of the calculated maximum RBT to be applied during the active RBE.

In particular, the method includes collecting or measuring a set of inertial data during the active RBE, calculating a set of vehicle performance data using the set of inertial data, and comparing the calculated set of vehicle performance data to a corresponding set of calibrated threshold data to thereby determine or calculate the maximum RBT. The method also includes automatically applying the calculated maximum RBT during the active RBE.

The vehicle includes a chassis, at least one electric motor/generator operable for applying the calculated maximum RBT during an active RBE, and a frictional braking system for providing a frictional braking torque (FBT). The vehicle also includes a set of inertial sensors for measuring a set of chassis inertial data, as well as a controller having an algorithm for calculating a set of vehicle performance data using the set of chassis inertial data. The controller determines the maximum RBT by comparing the vehicle performance data to a corresponding set of threshold data, and automatically applies the maximum RBT during the active RBE.

A control system usable with the vehicle optimizes steering performance and stability during the active RBE described above. The control system includes sensors for measuring a set of chassis inertial data, including one or more of a brake sensor connected to a braking input device and operable for detecting a driver-commanded overall braking torque (OBT), a steering angle sensor connected to a steering input device and operable for detecting a steering angle from which a steering angle rate can be calculated, and one or more accelerometers operable for measuring a linear acceleration of the chassis of the vehicle with respect to a longitudinal and/or lateral axis of the chassis. The control system calculates a maximum regenerative braking torque (RBT) using the chassis inertial data, and automatically applies the maximum RBT during the active RBE.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 3 is a table describing a set of sensory input data for the controller usable with the vehicle of FIGS. 1 and 2.

DESCRIPTION OF THE PREFERRED EMBODIMENTS

Figure 1:
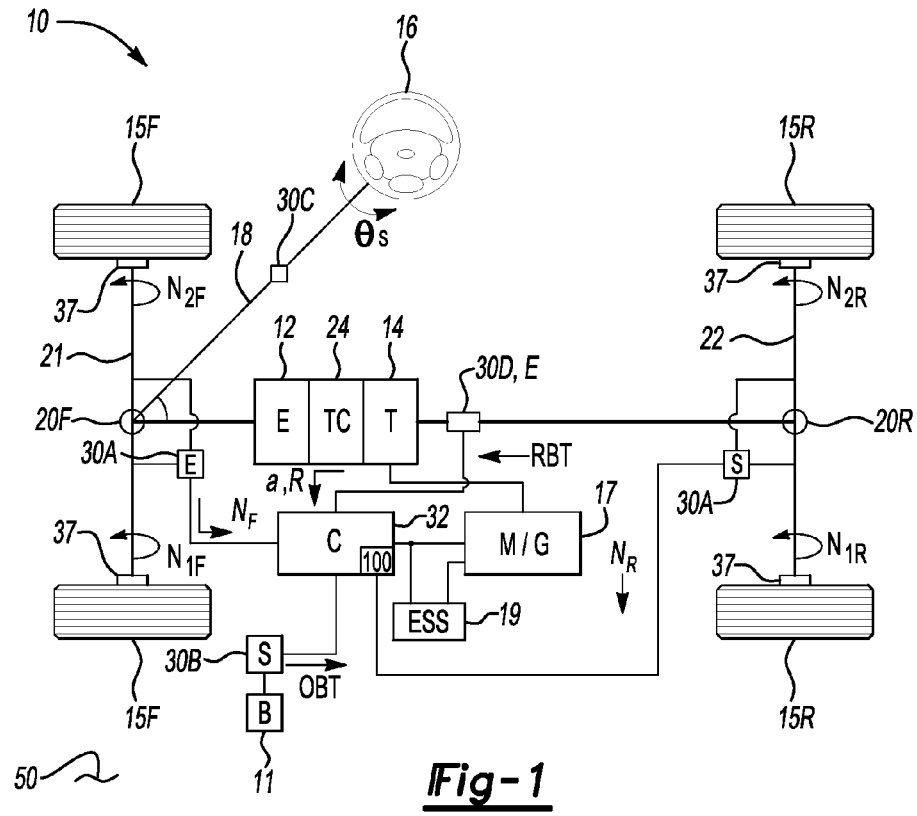
FIG. 1 is a schematic illustration of an exemplary hybrid electric vehicle or HEV in accordance with the invention.

With reference to the various Figures, wherein like reference numerals refer to like or similar components throughout the several figures, and beginning with FIG. 1, a vehicle 10 is shown as an exemplary hybrid electric vehicle or HEV, although within the scope of the invention the vehicle 10 could be configured as any vehicle having a regenerative braking capability. The exemplary vehicle 10 includes an energy conversion system or engine (E) 12, an electrical storage system (ESS) 19, and at least one electric motor/generator (M/G) 17. The engine 12 can be drivingly connected to a transmission (T) 14 directly or via a hydrodynamic torque converter assembly (TC) 24 as shown, or via another torque transfer mechanism such as a clutch (not shown). The vehicle 10 includes an electronic control unit or controller 32 having a braking control algorithm or method 100 as described below with reference to FIG. 4.

The controller 32 broadly describes a distributed or central control module, which in addition to a braking control module can also include such control modules and capabilities as might be necessary to operate the vehicle 10 in the desired manner. That is, the controller 32 can also include any or all of: an engine control module, a transmission control module, a battery pack control module, a transmission power inverter module, etc. If so configured, the controller 32 can provide overarching control and coordination of the aforementioned controllers. For simplicity, the controller 32 is represented as a single device, although separate controllers may also be used within the scope of the invention.

The controller 32 can be configured as a general purpose digital computer generally comprising a microprocessor or central processing unit, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Each set of algorithms resident in the controller 32 or accessible thereby, including the algorithm or method 100 of the invention, is stored in ROM and executed to provide the respective functions of each resident controller.

The ESS 19 can be configured as one or more batteries, although other electrical and/or electrochemical energy storage devices having the ability to store electric power and dispense the electric power can be used within the scope of the invention. The ESS 19 can be sized based on factors including regenerative braking requirements, application issues related to typical road grade and temperature, and propulsion requirements such as emissions, power assistance, and electric range. Generally, the ESS 19 is a relatively high-voltage direct current (DC) device coupled to a transmission power inverter module (not shown) via sufficiently constructed and routed DC cabling, as will be understood by those of ordinary skill in the art.

Still referring to FIG. 1, the engine 12 can be configured as, for example, a gasoline, diesel, biodiesel, ethanol, or other style of internal combustion engine within the scope of the invention. However configured, the engine 12 is capable of generating a sufficient amount or level of engine torque for rotating an output or drive shaft of the HEV 10, which ultimately rotates or powers a respective set of front and/or rear drive axles 21, 22 as needed. In this manner, the HEV 10 can be propelled via a set of drive wheels 15F, 15R, with F referring to "front" and R referring to "rear" with respect to normal passenger orientation within the vehicle 10.

The vehicle 10 can include a front and rear differential 20F, 20R, respectively, allowing the drive axles 21, 22 to independently rotate at different speeds on either side of the vehicle 10. That is, the front differential 20F can allow a rotational speed $N_{1F}$ on one side of the vehicle 10, and a potentially different rotational speed $N_{2F}$ on the other side of the vehicle 10. Likewise, the rear differential 20R can allow a rotational speed $N_{1R}$ on one side of the vehicle 10, and a potentially different rotational speed $N_{2R}$ on the other side of the vehicle 10.

The motor/generator 17 can operate alternately as a power supplier or as a power generator. When operating as an electric motor or a power supplier, the motor/generator 17, which may be a single unit or multiple units depending on the design of the vehicle 10, will supply power to the transmission 14. When operating as a generator, the motor/generator 17 will receive electrical power from the transmission 14. The controller 32 is adapted to route or distribute electrical energy from the motor/generator 17 to the ESS 19 for recharging of the ESS 19, and/or to distribute the electrical energy from the ESS 19 to another electrical power unit (not shown), which will be operating as an electric motor at that time.

The vehicle 10 includes a conventional electromechanical or hydraulic friction braking system 37, such as a fluid-actuated pad and/or drum style braking system, which is positioned in proximity to each drive wheel 15F, 15R and adapted to provide a frictional braking torque (FBT), which can be augmented by an electronic/regenerative braking torque or RBT. When a driver or operator of the vehicle 10 depresses a braking input device (B) 11 such as a brake pedal to thereby input a force and travel describing a driver-commanded overall braking torque (OBT), the friction braking system 37 slows the vehicle 10 via a combination of the FBT and the RBT as described below.

Still referring to FIG. 1, the vehicle 10 is also equipped with a plurality of wheel speed sensors (S) 30A which can measure the wheel speed data, i.e., $N_{1F}$, $N_{1R}$, $N_{2F}$, and $N_{2R}$ and also determine a level of slip between the wheels 15F, 15R and a road surface 50. A vehicle speed can be calculated by the controller 32 using the wheel speed data, i.e., $N_{1F}$, $N_{1R}$, $N_{2F}$, and $N_{2R}$ as described above. The front axle 21 can be divided into two independently rotating sides by the front differential 20F, and the rear axle 22 can be divided into two independently rotating sides by the rear differential 20R. There exists at each wheel 15F, 15R the potential to slip relative to the road surface 50. Therefore, the speeds of the wheels 15F, 15R are respectively represented in FIG. 1 as $N_{1F}$ and $N_{2F}$ for the potentially different rotational speeds of the two sides of the front axle 21, and $N_{1R}$ and $N_{2R}$ for the potentially different rotational speeds of the two sides of the rear axle 22.

The controller 32 receives the input signals from various locations of the vehicle 10, with these signals including but not limited to: engine torque, engine speed, electric motor torque and direction, throttle or accelerator position or demand, etc. The controller 32 also receives a set of inertial data, potentially including a driver-commanded OBT applied to the braking input device 11 and measured by a braking input sensor 30B, as well as the wheel speeds from the sensors 30A described above.

The vehicle 10 also includes a steering column 18 and a steering input device 16 such as a steering wheel operable for steering the drive wheels 15F. The steering input device 16 and/or steering column 18 is connected to a steering angle sensor 30C providing a steering angle θs as another element of the set of inertial data, from which a steering angle rate can be readily calculated. Finally, a set of accelerometers 30D measure or detect a linear acceleration (a) of the vehicle 10 along its lateral and/or longitudinal axes X, Y as described below with reference to FIG. 2, and a gyroscopic device or yaw rate sensor 30E for measuring or detecting a yaw rate (R) of the vehicle 10 with respect to its vertical or Z axis, also as described below with reference to FIG. 2. The signals $N_R$, $N_F$, OBT, θs, a, and R are collected by the respective sensors 30A-E and relayed as a set of input signals to the controller 32 via a hardwired or wireless connection.

Figure 2:
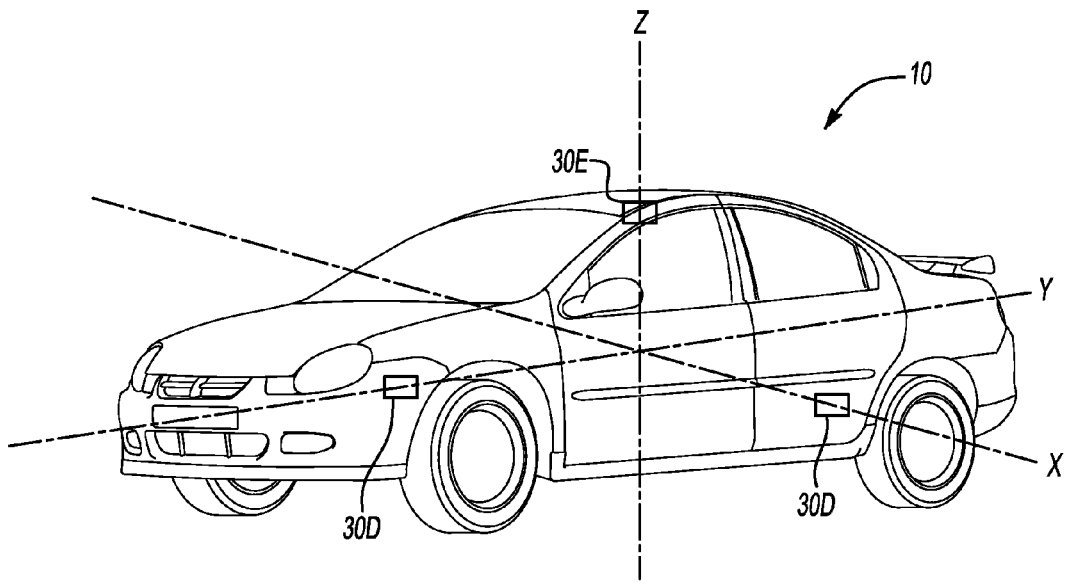
FIG. 2 is a schematic perspective view of the vehicle of FIG. 1.

Referring to FIG. 2, the vehicle 10 of FIG. 1 has three primary axes X, Y, and Z. The X axis refers herein to the lateral axis of the vehicle 10, while the Y and Z axes refer to the longitudinal and vertical axis of the vehicle 10, respectively. As shown in FIG. 2 and described above, the vehicle 10 includes a plurality of inertial sensors, including the sensors 30A-30E of FIG. 1. With respect to the sensors 30D in particular, these devices are configured as accelerometers and are operable for measuring the dynamic linear acceleration of the vehicle 10 along its respective axis X or Y. A sensor 30E such as a gyroscope can be positioned on the vertical or Z axis of the vehicle 10, with the sensor operable for detecting or measuring an actual yaw rate ($R_{ACTUAL}$) of the vehicle 10 as an additional element of the set of inertial data described above.

Referring to FIG. 3, a table 40 generally describes a set of sensory input data provided to the controller 32 of FIG. 1 by the sensors 30A-30E. Within the scope of the invention, the method 100 of FIG. 3 is executed only during a threshold braking event, i.e., during an active and ongoing regenerative braking event or RBE, otherwise controlling the braking of the vehicle 10 as directed or commanded by the controller 32 using a default or overall braking control algorithm (not shown). As shown in the table 40, the sensor 30A transmits the signals $N_F$, $N_R$ to the controller 32 where the values for these measurements are temporarily stored or recorded. The sensor 30B measures the driver-commanded overall braking torque (OBT) (see FIG. 1). The sensor 30C measures the steering angle ($θ_S$). The sensors 30D measure the linear acceleration ($a_{X,Y}$) of the vehicle 10 of FIGS. 1 and 2 for the respective lateral (X-axis) and longitudinal (Y-axis) directions of the vehicle 10 of FIG. 2. Finally, the sensor 30E measures the angular velocity or actual yaw rate ($R_{ACTUAL}$) of the vehicle 10 around its vertical or Z axis, with the output of the sensor 30E provided in degrees per second or radians per second.

Using the sensory input signals from the sensors 30A-E, the controller 32 can calculate various vehicle performance characteristics during an active RBE, and can calculate a maximum RBT, hereinafter referred to as $RBT_{MAX}$, based on these values as described below with reference to FIG. 4. The controller 32 of FIG. 1 can selectively reduce the RBT that is ultimately applied during an active RBE by setting the value of $RBT_{MAX}$ anywhere from a zero value up to the theoretical maximum value allowable or possible based on the specific design of the motor/generator 17 and the ESS 19 of FIG. 1. In other words, input signals from some or all of the sensors 30A-E, depending on the particular vehicle characteristic being determined, are used as sensory inputs to the controller 32 to determine a maximum magnitude of an RBT that can be applied during the regenerative braking event or RBE without causing the vehicle 10 of FIGS. 1 and 2 to oversteer or understeer.

During normal braking operations, the maximum value or $RBT_{MAX}$ calculated by the controller 32 is expected to be substantially equal to the theoretical maximum value, while the value of $RBT_{MAX}$ during certain braking events, such as on a low coefficient of friction surface during an active ABS event or other threshold braking condition, might result in a calculated value for $RBT_{MAX}$ having a lower magnitude, down to and including a zero value. In the event of an applied zero value for $RBT_{MAX}$, all of the required or requested braking as determined by the driver-commanded OBT of FIG. 1 could be supplied using the frictional braking torque or FBT from the frictional braking system 37. The controller 32 can therefore selectively modify the value of $RBT_{MAX}$ from a zero value up to the theoretical maximum value depending on the measured and/or calculated vehicle performance data.

Figure 4:
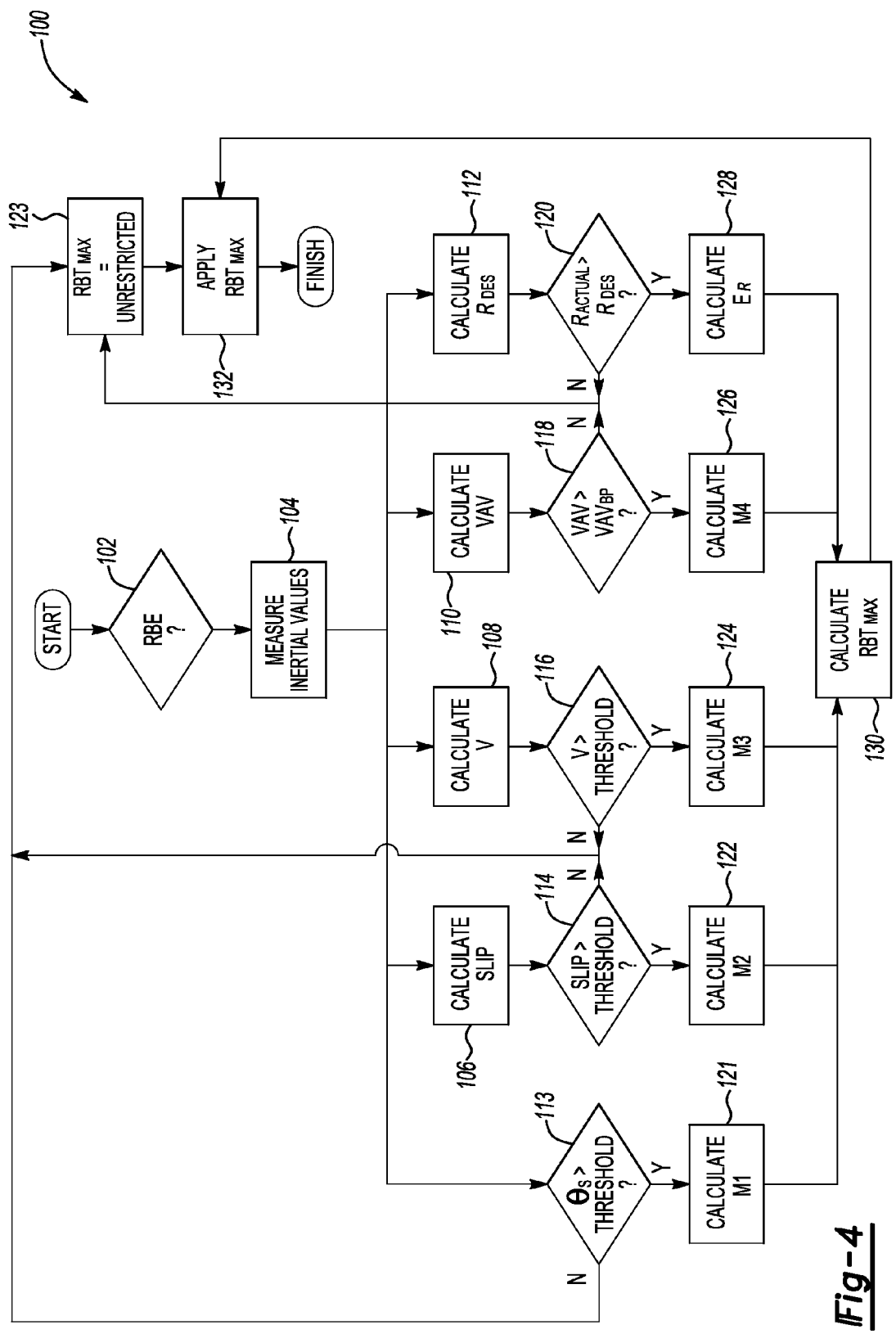
FIG. 4 is a schematic flow chart describing a control algorithm or a method usable with the vehicle of FIGS. 1 and 2.

Referring to FIG. 4, the algorithm or method 100 of FIG. 1 is shown in more detail. Beginning with step 102, the method 100 includes sensing, measuring, and/or otherwise determining the presence of an active regenerative braking event (RBE). If an active RBE is detected, the method 100 proceeds to step 104.

At step 104, a set of inertial information or data is measured using the sensors 30A-E shown in FIGS. 1 and 2 as described above. That is, the sensors 30A transmit signals describing the wheel speeds $N_{1F}$, $N_{2F}$, $N_{1R}$, $N_{2R}$, the sensor 30B measures a force and/or travel describing a driver-commanded overall braking torque (OBT), the sensor 30C measures the input steering angle ($θ_S$), the sensors 30D measure the linear acceleration ($a_{X,Y}$) of the vehicle 10, and the sensor 30E measures the angular velocity or actual yaw rate ($R_{ACTUAL}$) of the vehicle 10. After measuring the set of chassis inertial data the method 100 proceeds to steps 106, 108, 110, and 112 simultaneously.

At step 106, the method 100 includes calculating a first set of vehicle performance data, i.e., a wheel slip rate of the wheels 15F, 15R relative to the road surface 50 of FIG. 1 as described above and abbreviated simply as "slip" in FIG. 4. As will be understood by those of ordinary skill in the art, wheel slip can be calculated using the measured wheel speeds $N_F$ and $N_R$ and the calculated vehicle speed V (see step 108). The method 100 then proceeds to step 114.

At step 108, the method includes calculating a second set of vehicle performance data, i.e., a velocity V of the vehicle 10 of FIG. 1, using the measured wheel speeds $N_F$, $N_R$ as described above. The method 100 then proceeds to step 116.

At step 110, the method includes calculating a third set of vehicle performance data, i.e., a vehicle acceleration vector (VAV) for the vehicle 10 of FIG. 1. Step 110 can be achieved using the measured linear accelerations ($a_X$, $a_Y$) as described above. The method 100 then proceeds to step 118.

At step 112, the method includes calculating a fourth set of vehicle performance data, i.e., a desired yaw rate $R_{DES}$ for the vehicle 10 of FIG. 1. As will be understood by those of ordinary skill in the art, a desired yaw rate $R_{DES}$ can be calculated using the steering angle $θ_S$ and the calculated vehicle speed V of step 108. The method 100 then proceeds to step 120.

At step 113, the steering angle $θ_S$ measured at step 104 is compared to a corresponding steering angle threshold, a calibrated value which can be stored in a lookup table that is readily accessible by the controller 32 or otherwise calculated or determined. As those of ordinary skill in the art will recognize that a steering angle rate can be calculated from the measured steering angle $θ_S$, step 113 can also be executed by comparing the calculated steering angle rate to a threshold steering angle rate. For simplicity, only the steering angle $θ_S$ is shown in FIG. 4. If the steering angle $θ_S$ or calculated steering rate from step 104 exceeds the calibrated threshold, the method 100 proceeds to step 121. Otherwise, the method 100 proceeds to step 123.

At step 114, the wheel slip rate or slip calculated at step 106 is compared to a corresponding slip threshold, a calibrated value which can be stored in a lookup table that is readily accessible by the controller 32 or otherwise calculated or determined. If the slip calculated at step 106 exceeds the calibrated threshold, the method 100 proceeds to step 122. Otherwise, the method 100 proceeds to step 123.

At step 116, the calculated vehicle speed V from step 116 is compared to one of two corresponding vehicle speed thresholds, a calibrated value for each of a high speed and a low speed, which can be stored in a lookup table accessible by the controller 32 or otherwise calculated or determined. If the vehicle speed V calculated at step 116 exceeds the corresponding calibrated vehicle speed threshold, the method 100 proceeds to step 124. Otherwise, the method 100 proceeds to step 123.

At step 118, the calculated vehicle acceleration vector (VAV) from step 118 is compared to a corresponding VAV threshold or VAV breakpoint, a calibrated value which can be stored in a lookup table accessible by the controller 32 or otherwise calculated or determined. If the vehicle speed vector VAV calculated at step 118 exceeds the calibrated VAV threshold or breakpoint, the method 100 proceeds to step 126. Otherwise, the method 100 proceeds to step 123.

At step 120, the calculated desired yaw rate ($R_{DES}$) from step 120 is compared to the actual yaw rate $R_{ACTUAL}$ detected or measured by the sensor 30E of FIG. 2 as part of step 104. If the actual yaw rate $R_{ACTUAL}$ exceeds the calculated desired yaw rate ($R_{DES}$), the method 100 proceeds to step 128. Otherwise, the method 100 proceeds to step 123.

At step 121, the measured steering angle $\theta_S$ can be relayed or output to a table stored in or accessible by the controller 32. A multiplier M1 ranging from 0 to 1 is then selected, with the exact value depending upon the variance between the measured steering angle $\theta_S$ and the calibrated threshold for that value. Once the multiplier M1 has been selected, the method 100 proceeds to step 130.

At step 122, the calculated slip from step 106 can be relayed or output to a table stored in or accessible by the controller 32. A multiplier M2 ranging from 0 to 1 is then selected, with the exact value depending upon the variance between the calculated slip rate and the calibrated threshold for that value. Once the multiplier M2 has been selected, the method 100 proceeds to step 130.

At step 123, the maximum regenerative braking torque or $RBT_{MAX}$ is set equal to the maximum theoretical value of the regenerative braking capability of the vehicle 10 of FIG. 1. That is, the value of $RBT_{MAX}$ is unrestricted by the method 100, such that any driver-commanded overall braking torque (OBT) is allocated or apportioned between a maximum available RBT, with any required additional braking torque provided via the frictional braking torque or FBT of the frictional braking system 37. The method 100 is then finished.

At step 124, the calculated vehicle speed V from step 108 can be relayed or output to a table stored in or accessible by the controller 32. A multiplier M3 ranging from 0 to 1 is then selected, with the exact value depending upon the variance between the calculated vehicle speed and one of two calibrated thresholds for that value. A first threshold can be used for high speed, while a second threshold can be used for low speed, with "high" and "low" being calibrated values. Once the multiplier M3 has been selected, the method 100 proceeds to step 130.

At step 126, the calculated vehicle acceleration vector or VAV from step 110 can be relayed or output to a table stored in or accessible by the controller 32. A multiplier M4 ranging from 0 to 1 is then selected, with the exact value depending upon the variance between the calculated VAV and a calibrated breakpoint VAV ($VAV_{BP}$). Once the multiplier M4 has been selected, the method 100 proceeds to step 130.

At step 128, a resultant yaw rate error value ($E_R$) is calculated, with the resultant yaw rate error value ($E_R$) being equal to the difference between the actual yaw rate ($R_{ACTUAL}$) sensed by the sensor 30E of FIG. 2 and the desired yaw rate ($R_{DES}$) determined at step 112. The method 100 then proceeds to step 130.

At step 130, the method 100 uses all of the multipliers M1-M4 selected or calculated at steps 121, 122, 124, and 126 as described above, as well as the error value $E_R$ of step 128, and applies the multipliers and/or the error value $E_R$ to thereby calculate a maximum regenerative braking torque ($RBT_{MAX}$). The $RBT_{MAX}$ can be calculated or determined in various ways within the scope of the invention. The relative values of the inertial values measured at step 104 can be weighted equally or differently, depending on the intended design of the vehicle 10.

For example, one could prioritize the resultant wheel slip rate error ($E_S$) of step 122, limiting the value for $RBT_{MAX}$ in a more aggressive manner when the resultant wheel slip error ($E_S$) is calculated above a calibrated threshold. Such error value weighting could be used when slowing or braking the vehicle 10 on a relatively low coefficient of friction surface, such as when the road surface 50 of FIG. 1 is coated with ice or snow. Likewise, any of the other inertial values could also be more or less heavily weighted depending on the design of the controller 32 and vehicle 10 of FIG. 1, thus potentially influencing the selection of the multiplier M1-M4. Or, one could average all of the multipliers M1-M4 and the resultant wheel slip error ($E_S$) to calculate an unweighted or weighted average multiplier, applying this value in calculating the value for $RBT_{MAX}$.

While the best modes for carrying out the invention have been described in detail, those familiar with the art to which this invention relates will recognize various alternative designs and embodiments for practicing the invention within the scope of the appended claims.

The invention claimed is:

1. A method of optimizing performance of a vehicle having a plurality of road wheels, and a regenerative braking capability adapted for electronically braking the vehicle during an active regenerative braking event (RBE), the method comprising:
   measuring a set of inertial data of the vehicle during the active RBE using a plurality of inertial sensors, including measuring a rotational speed of each of the road wheels, an input steering angle of the vehicle, an acceleration value of the vehicle, and an actual yaw rate of the vehicle;
   transmitting the set of inertial data to a controller of the vehicle;
   calculating, via the controller, a set of vehicle performance data using said set of inertial data, including calculating each of a wheel slip rate of the road wheels, a velocity of the vehicle, a vehicle acceleration vector, and a desired yaw rate;
   comparing said set of vehicle performance data to a corresponding set of calibrated threshold data to thereby determine a variance with respect to the corresponding set of calibrated threshold data for each of the input steering angle, the wheel slip rate, the velocity, the vehicle acceleration vector, and the desired yaw rate;

calculating a maximum regenerative braking torque (RBT), including:

applying a multiplier having a value ranging from 0 to 1 to each of the input steering angle, the wheel slip rate, the velocity, and the vehicle acceleration vector, wherein the value of the multiplier corresponds to the calculated variance;

calculating a resultant yaw rate error value as a function of the desired yaw rate and the actual yaw rate; and calculating the maximum RBT as a function of the resultant yaw rate error value and the multiplier-applied wheel slip rate, the multiplier-applied input steering angle, the multiplier-applied velocity, and the multiplier-applied vehicle acceleration vector; and automatically applying said calculated maximum RBT via an electric motor/generator during the active RBE.

2. The method of claim 1, wherein said measuring a set of inertial data using a plurality of inertial sensors includes at least one of: measuring, as the acceleration value, a lateral acceleration and a longitudinal acceleration of the vehicle using an accelerometer, measuring a rotation of the vehicle with respect to a vertical axis of the vehicle using a gyroscope, measuring the input steering angle of the vehicle using a steering angle sensor, and measuring the rotational speed of each of the plurality of road wheels using a wheel speed sensor.

3. The method of claim 2,
wherein said calculating a set of vehicle performance data includes calculating the desired yaw rate of the vehicle using said input steering angle.

4. The method of claim 2, said measuring a set of inertial data includes measuring each of the lateral acceleration and the longitudinal acceleration of the vehicle; and
wherein said calculating a set of vehicle performance data includes calculating the vehicle acceleration vector using the measured lateral acceleration and the measured longitudinal acceleration.

5. The method of claim 1, wherein said corresponding set of calibrated threshold data includes each of: the actual yaw rate of the vehicle, a threshold acceleration vector of the vehicle, a threshold speed of the vehicle, a threshold steering angle of the vehicle, and a threshold slip rate of the set of road wheels.

6. The method of claim 1, wherein the vehicle includes a frictional braking system operable for providing a frictional braking torque (FBT), the method further comprising:
determining a driver-commanded overall braking torque (OBT); and
allocating said driver-commanded OBT between said maximum RBT and the FBT during said active RBE such that when said maximum RBT is zero, said driver-commanded OBT is provided using only said FBT.

7. A vehicle comprising:
a chassis;
a set of road wheels positioned with respect to the chassis;
at least one electric motor/generator operable for applying a maximum regenerative braking torque (RBT) for electronically braking the vehicle during an active regenerative braking event (RBE);
a frictional braking system operable for providing a friction braking torque (FBT) for frictionally braking the vehicle;
a steering input device;
a set of chassis inertial sensors that collectively measure a set of chassis inertial data, including a rotational speed of each of the road wheels, an input steering angle of the input steering device, an acceleration value of the vehicle, and an actual yaw rate of the vehicle; and a controller in communication with the chassis inertial sensors, and configured to calculate a set of vehicle performance data using said set of chassis inertial data, wherein the set of vehicle performance data includes each of a wheel slip rate of the road wheels, a velocity of the vehicle, a vehicle acceleration vector, and a desired yaw rate;

wherein said controller:
calculates a resultant yaw rate error value as a function of the desired yaw rate and the actual yaw rate;
compares said set of vehicle performance data to a set of corresponding threshold data to calculate a variance for each of the data in the set of vehicle performance data;
applies a multiplier having a value ranging from 0 to 1 to each of the input steering angle, the wheel slip rate, the velocity, and the vehicle acceleration vector, wherein the value of the multiplier corresponds to the calculated variance;
calculates the maximum RBT as a weighted function of the calculated resultant yaw rate error value and the multiplier-applied input steering angle, the multiplier-applied wheel slip rate, the multiplier-applied velocity, and the multiplier-applied vehicle acceleration vector; and
automatically applies said calculated maximum RBT using the at least one electric motor/generator during said active RBE.

8. The vehicle of claim 7, wherein said controller is operable for determining a driver-commanded overall braking torque (OBT) using one of said set of chassis inertial sensors, and for allocating said driver-commanded OBT between said maximum RBT and said FBT during said active RBE.

9. The vehicle of claim 7, wherein said chassis has a lateral axis and a longitudinal axis, and wherein said set of chassis inertial sensors includes:
a first accelerometer positioned on said lateral axis for measuring a lateral acceleration of said chassis as one element of said set of chassis inertial data; and
a second accelerometer positioned on said longitudinal axis for measuring a longitudinal acceleration of said chassis as another element of said set of chassis inertial data.

10. The vehicle of claim 9, wherein said set of chassis inertial sensors includes a steering angle sensor positioned with respect to the steering input device and configured to measure said input steering angle.

11. The vehicle of claim 10, wherein said controller is operable for calculating the desired yaw rate using said input steering angle, for comparing said desired yaw rate to a calibrated threshold yaw rate as an element of said set of corresponding threshold data, for determining the resultant yaw rate error value, and for calculating said maximum RBT using said resultant yaw rate error value.

12. The vehicle of claim 7, wherein said controller is operable for calculating the slip rate of said each of said set of road wheels, for comparing said slip rate to a calibrated threshold slip rate as an element of said set of corresponding threshold data, for determining a resultant slip rate error, and for automatically modifying said requested RBT using said resultant wheel slip rate error.

13. A control system for optimizing the steering performance and stability of a hybrid electric vehicle (HEV) during an active regenerative braking event (RBE), the HEV having a chassis, a braking input device, a plurality of road wheels, a steering input device, and regenerative braking capability, the control system comprising:

a plurality of sensors that collectively measures a set of chassis inertial data, said sensors including a brake sensor connected to the braking input device and operable for detecting an operator-commanded overall braking torque (OBT), wheel speed sensors that measure the rotational speeds of each of the road wheels, a gyroscope operable for measuring an actual yaw rate of the vehicle, a steering angle sensor connected to the steering input device and operable for detecting an input steering angle of the vehicle, and at least one accelerometer operable for measuring a linear acceleration of the HEV with respect to an axis of the chassis; and a controller in communication with the plurality of sensors; wherein the controller:

calculates a set of vehicle performance data using information from the wheel speed sensors, the steering angle sensor, and the at least one accelerometer;

compares each of the data in the set of vehicle performance data to a corresponding calibrated threshold to determine a respective variance;

applies a multiplier having a value ranging from 0 to 1 to each of the data in the set of vehicle performance data, wherein the value of the multiplier corresponds to the calculated variance;

calculates a resultant yaw rate error value as a function of a desired yaw rate and the actual yaw rate;

calculates a maximum regenerative braking torque (RBT) as a function of each of the multiplier-applied data and the resultant yaw rate error value; and automatically applies said calculated maximum RBT during the active RBE.

14. The control system of claim 13, wherein said at least one accelerometer includes:

a first accelerometer operable for measuring the linear acceleration of the chassis along a lateral axis of the chassis; and a second accelerometer operable for measuring the linear acceleration of the chassis along a longitudinal axis of the chassis.

15. The control system of claim 13, the HEV including a frictional braking system operable for providing a frictional braking torque (FBT);

wherein the control system is operable for allocating a driver-commanded overall braking torque (OBT) between said maximum RBT and said FBT during said active RBE such that when said maximum RBT is zero, said driver-commanded OBT is provided using only said FBT.

16. The control system of claim 13, wherein the calibrated thresholds are stored in a lookup table.

\* \* \* \* \*